United States Patent
Abel et al.

(10) Patent No.: US 10,011,290 B2
(45) Date of Patent: Jul. 3, 2018

(54) RECONFIGURABLE EQUIPMENT DISTRIBUTION CART

(71) Applicants: Gary V. Abel, Ellicott City, MD (US); Robert M. Giberson, Midlothian, VA (US)

(72) Inventors: Gary V. Abel, Ellicott City, MD (US); Robert M. Giberson, Midlothian, VA (US)

(*) Notice: Subject to any disclaimer, the term of this patent is extended or adjusted under 35 U.S.C. 154(b) by 0 days.

(21) Appl. No.: 14/995,717

(22) Filed: Jan. 14, 2016

(65) Prior Publication Data

US 2016/0200337 A1 Jul. 14, 2016

Related U.S. Application Data

(60) Provisional application No. 62/103,189, filed on Jan. 14, 2015.

(51) Int. Cl.
*B62B 3/00* (2006.01)

(52) U.S. Cl.
CPC .......... *B62B 3/005* (2013.01); *B62B 2205/32* (2013.01)

(58) Field of Classification Search
CPC .. B62B 3/00; B62B 3/02; B62B 3/002; B62B 3/10; B62B 5/0006; B62B 2202/12; B62B 2202/20
USPC ....................................................... 280/79.3
See application file for complete search history.

(56) References Cited

U.S. PATENT DOCUMENTS

| | | | | | |
|---|---|---|---|---|---|
| 2,575,661 A | * | 11/1951 | Hickey | ................ | A61G 12/001 211/85.14 |
| 2,874,860 A | * | 2/1959 | King | ........................ | B62B 3/02 16/19 |
| 3,007,708 A | * | 11/1961 | Ochs | ...................... | A47B 55/02 108/107 |
| 3,034,673 A | * | 5/1962 | Schulz | ..................... | B62B 1/12 414/457 |
| 3,101,148 A | * | 8/1963 | Brown | ..................... | A47F 5/13 108/163 |
| 3,438,238 A | * | 4/1969 | Wallis | .................... | B21C 37/28 72/369 |
| 3,450,416 A | * | 6/1969 | Mulder | .................... | B62K 9/02 280/211 |
| 3,698,735 A | * | 10/1972 | Bloomfield | ............ | B62B 3/006 280/47.35 |

(Continued)

*Primary Examiner* — Frank Bennett Vanaman
(74) *Attorney, Agent, or Firm* — Royal W. Craig; Baker Donelson, PC (57) ABSTRACT

A utility cart for storage and transport of a touch-screen voting terminal, separate ballot counter, and multiple (collapsible) voting booths in a more convenient and secure manner. The cart is generally formed with a pair of opposing side-rails of tubing bent in a rectangular loop with one or more pairs of horizontal struts for supporting a suspended shelving unit, wherein the vertical distance between a shelving unit and the corresponding pair of horizontal struts is adjustable to allow for various combinations of differently sized voting equipment to alternately be stored thereon. The suspended shelves increase the weight capacity of the shelving unit. The cart may also have a bumper along the bottom edge of a lower deck to allow several carts to be stored or transported together and moved by laypersons while minimizing the risk of injury or impact to equipment housed on the carts.

13 Claims, 5 Drawing Sheets

(56) References Cited

U.S. PATENT DOCUMENTS

| | | | | | |
|---|---|---|---|---|---|
| 3,887,207 | A | * | 6/1975 | Gotsch, Jr. ................ | B62B 3/10 108/187 |
| 3,893,686 | A | * | 7/1975 | Morgan .................. | B62B 3/002 280/651 |
| 3,908,562 | A | * | 9/1975 | Wittschen ............... | A47F 5/135 108/163 |
| 3,977,334 | A | * | 8/1976 | Carroll ...................... | A47F 5/13 108/134 |
| 4,055,362 | A | * | 10/1977 | Becker, III ............ | B62B 5/0006 293/121 |
| 4,157,070 | A | * | 6/1979 | Huempfner ............ | A47B 96/00 108/107 |
| 4,986,555 | A | * | 1/1991 | Andreen ................. | A47L 13/10 280/47.35 |
| 5,257,794 | A | * | 11/1993 | Nakamura ............... | B62B 3/00 211/182 |
| 6,173,847 | B1 | * | 1/2001 | Zellner, III ............ | A47B 55/02 211/186 |

* cited by examiner

RECONFIGURABLE EQUIPMENT DISTRIBUTION CART

CROSS-REFERENCE TO RELATED APPLICATION(S)

The present application derives priority from U.S. Provisional Patent Application Ser. No. 62/103,189 filed 14 Jan. 2015.

BACKGROUND a. Field of Invention

The invention relates to utility, storage and/or transport carts and, more particularly, to a specially-adapted utility cart for storage and/or transport of items such as voting machines and equipment in a more convenient and safe manner.

b. Background of the Invention

There are a myriad of existing storage and transport carts currently in use for a wide variety of different applications. Some of these carts are adapted for carrying sensitive electronic equipment, and others carry large and/or heavy items. Utility carts for voting machines must combine both sets of attributes inasmuch as voting machines are valuable electronic devices and are extremely heavy. Thus, a very robust utility cart is required to carry such devices.

There are a number of different types of balloting terminals that are used in either paper-based or electronic voting systems across the United States. In a paper-based voting system, moreover, balloting terminals typically include both a ballot tabulation unit either permanently or temporarily secured to one or more ballot boxes. The ballot box and/or the ballot tabulation unit/ballot box combination may be expandable or collapsible and may come with additional accessories or features that alter its size and/or weight, such as batteries, locking mechanisms, varying types of privacy screens, tables, and specialty equipment to assist disabled persons in using the balloting terminal. As an example of one type of voting machine, Castro & Harris manufactures the ES&S Model M100 Ballot Counter, a high-speed central paper ballot counter which, when combined with a ballot box, is approximately the size of a large computer server (approximately 2.5'×2'×4.5') and weighs approximately 20 lbs. By contrast, electronic balloting systems such as the AccuVote®-TSX distributed by Premier Election Solutions™ is roughly 1'×2'×4" in its un-deployed form and approximately 26 lbs. Some electronic balloting systems may also require stands to hold them in an upright position during voting.

Paper balloting systems additionally may comprise a separate ballot marking terminal, for example, to assist disabled voters in marking their paper ballots. An example of such a terminal is the ES&S AutoMARK voter assist terminal, which is 48 lbs and approximately 1.5'×2'×1', although the dimensions of these and other balloting units may change between storage and deployment.

Typically in the paper balloting system, each precinct will also provide one or more special voting terminals for handicapped persons. For example, Castro & Harris, Inc. distributes the AutoMARK™ voter assist terminal, a ballot-marking system designed to provide privacy and accessibility to voters who are blind, vision-impaired, or have a disability or condition that would make it difficult or impossible to mark a ballot with a typical paper ballot system. The AutoMARK terminal is sized at approximately 2'×1'×1.5', although the dimensions of this and other balloting units may change between storage and deployment, and weighs 48 lbs.

Voting occurs in a multitude of precincts, the number and locations of which are chosen to accommodate all eligible voters in a given geographic area. Therefore, the population of eligible voters in a given area, along with the types of voting technology available to that precinct, will determine how many and which types of voting equipment (including ballot counting devices, ballot boxes, ballot marking systems and accessories) will be needed for a given polling location. In urban areas, a single polling facility may be required to accommodate hundreds of voters or more, and therefore a considerable amount of voting equipment must be moved to that polling place. In addition, such as in less populated areas, a single polling place could be chosen to accommodate multiple voting precincts. In some cases, neighboring precincts served by a single polling place may utilize different ballot styles such that multiple types of voting equipment is required to accurately mark, count, and store the disparate ballots. The type, quantity, variety, and overall weight of the voting equipment needed to outfit a single polling place thus fluctuates widely between polling centers based on population density and other factors, and changes as voting technology evolves.

Moreover, in the case of every precinct, the voting equipment is moved from a secure storage location to the polling place, arranged in the polling place during the voting period, and then moved back to the storage facility or to a processing center after voting is complete. Often, facilities such as schools and office buildings are chosen as polling places due to their typically central location, handicap access, availability of parking, etc. To prevent extreme disruption to the operation of such facilities, it is most often required that voting equipment is quickly transported in and out of the polling place immediately before and after the appointed time for voting. Poll workers of varying ages and physical abilities often assist in the process of setting up and disassembling the equipment for a given precinct.

It is convenient for each precinct to transport multiple pieces of voting equipment on a utility cart so that the equipment can be wheeled into position for use. However, the utility cart that serves this purpose must be lightweight, extremely strong and durable, and extremely protective of its contents. For example, some jurisdictions may want to store and transport five or ten direct-recording electronic (DRE) voting systems on a single cart, but these are heavy and very fragile electronic systems. Voting equipment is at its most vulnerable during transportation and storage. Thus, all the loaded equipment must be fully restrained against lateral and vertical motion, and yet all equipment must preferably be given full access to their control panels, doors, etc. Moreover, any transport cart design should keep its weight to a minimum with a framework that is as light weight as possible. What is needed is a multi-compartmentalized cart with robust mechanical restraints to protect against shifting of the equipment and yet full frontal and side access to both pieces of equipment to allow access to the consoles.

Traditionally, generic utility carts have been purchased to perform the above-mentioned tasks, and these normally comprise a simple platform mounted on wheels or casters to provide mobility. These carts may be provided with upwardly protruding side-rails to constrain the equipment and yet provide proper access. Typical prior art carts used for this purpose are either not able to hold more than a small handful of individual pieces of voting equipment, or, where heavy-duty carts are enlisted, they are not adaptable to the unique shapes and sizes of various pieces of voting equipment and therefore do not properly restrain different types of voting equipment in a secure fashion.

It would be greatly advantageous to provide a utility cart specifically adapted for voting machines that incorporates multiple reconfigurable shelves for the voting equipment, robust mechanical restraints to protect against shifting of the equipment, and yet provides full frontal and side access to each piece of equipment to allow easy off- and on-loading. In addition, from a commercial standpoint, it is also necessary that the cart be as light in weight and inexpensive as possible. The weight of the cart is important because the lighter the weight, the higher degree of mobility. In order to keep the weight to a minimum, it is desirable that the framework be as light weight as possible without sacrificing stability and security.

Moreover, it would be advantageous to have a cart that is adaptable to various uses in fields other than the transportation and storage of voting equipment, such as in the medical field, where hospital administration necessitates the storage and transport of equipment of various and changing sizes and shapes which must be readily available upon arrival.

SUMMARY OF THE INVENTION

It is, therefore, an object of the present invention to provide a storage and transport cart specifically adapted for voting machines and equipment, but adaptable for uses with other types of equipment, that incorporates multiple reconfigurable shelves for storing and transporting a variety of election equipment as required by various precincts such that the same cart can be utilized by multiple precincts and can adapt to transport and store technologically evolving voting machinery.

It is another object of the present invention to provide a storage and transport cart that is adaptable for use in any industry and with any type of equipment that must be stored in an off-site facility but must be readily transportable and usable upon arrival, which cart can be used to store and transport various sizes and shapes of machinery and also to house such machinery during use.

It is yet another object to provide a storage and transport cart as above that provides robust mechanical restraints to protect against shifting of the equipment, and yet provides full frontal and side access to each piece of equipment to allow easy off- and on-loading.

It is still another object to provide a multi-shelf storage and transport cart with high-weight-bearing shelves capable of supporting multiple, e.g., touch-screen voting terminals such as the AutoMARK (vendor specifications indicate each weighs 48 pounds), central ballot counters such as the ES&S Model M100 (30 pounds), etc., which collective weights is significant with respect to delivery to and setup at the polling places.).

It is another object to provide a storage and transport cart as above that provides additional storage and transport for other accessory items required for voter precincts. Examples of required items are extension cords and handicap accessory kits (signs, door stops, specialty door knob, specialty pencils, and magnifiers).

It is still another object to provide a storage and transport cart as above that maximizes strength and usability, and yet keeps weight to a minimum with a framework that is as light weight as possible.

It is still another object to provide a storage and transport cart as above that allows for safe handling of same by polling workers of all ages and physical abilities, even when fully laden with heavy voting equipment.

According to the present invention, the above-described and other objects are accomplished by providing a specially-adapted utility cart for storage and/or transport of voting machines in a more convenient and safe manner. The utility cart is capable of supporting a touch-screen voting terminal, separate ballot counter, multiple (collapsible) voting booths, and an area to store the accessory items required by the voter precinct. The arrangement of shelving on the cart is adjustable such that different types of voting equipment may be stored and transported as necessary. These and other equipment may be wheeled into usable positions in the precinct, the voting booths removed and set up, and the precinct is then ready for voting traffic. Separate storage areas for each type of equipment are advantageously formed by a suspended shelving configuration that enables each shelf to hold more weight than a conventional cart shelf. Extended "bumpers" on the bottom edge of the cart help to prevent injuries to workers engaged in moving the carts while still allowing multiple carts to fit cooperatively together in storage or at the polling place once unloaded to minimize the footprint of all carts needed to haul the requisite voting equipment. The cart according to the present invention may also be adapted to store, transport, and house other types of equipment that are stored in an off-site facility but must be readily transportable and usable upon arrival.

The cart is generally formed with a pair of opposing side-rails defined by contiguous tubing bent in a closed rectangular loop with one or more pairs of horizontal struts for supporting a suspended shelving unit, wherein the vertical distance between a shelving unit and the corresponding pair of horizontal struts is adjustable to allow for various combinations of differently sized voting equipment to alternately be stored thereon. The suspended shelves further increase the weight capacity of the shelving unit. In a second embodiment, the cart comprises a bumper feature along the bottom edge of a lower deck to allow several carts to be stored or transported together and moved by laypersons while minimizing the likelihood of large impacts to the equipment housed on the carts and the risk of injury to the persons moving said carts.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENT

The present invention is an adaptable utility cart designed for storage and/or transport of multiple and various types of voting machines and accessory components in a convenient, safe and readily accessible manner.

Figure 1:
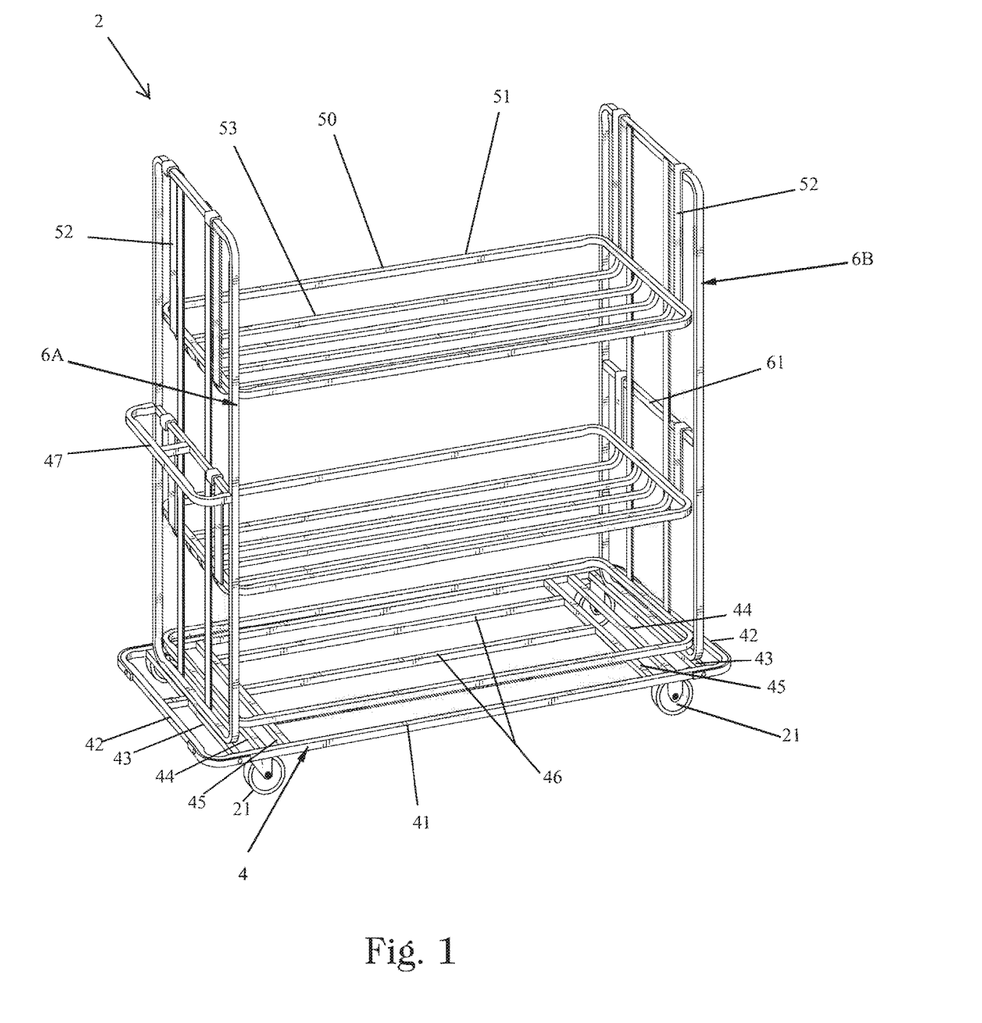
FIG. 1 is a front perspective view of the utility cart according to a first embodiment the present invention.

With reference to FIG. 1, the cart 2 generally comprises a substantially rectangular tubular framework defining a cuboid volume bounded at the bottom by a lower deck 4 and on either side by opposing side-rail assemblies 6A and 6 B. Lower deck 4 comprises a generally rectangular framework having two lateral end rails 41 running parallel to the front of cart 2 along, the elongate width of cart 2 and two or more transverse end rails 42, 43, 44, 45 perpendicular thereto. Importantly, for maximum strength and protection, the two lateral end rails 41 are formed integrally from a single tubular member with the two outermost transverse rails 42 in a rectangle with rounded edges of approximately 3" radius. In addition to the two outermost transverse rails 42, the lower deck 4 is reinforced by one or more additional transverse rails 43, 44, 45 as depicted in FIG. 1, each welded in place across lower deck 4. A transverse rail 43 on each, side of cart 2 is used to support side rail assemblies 6A and 613, and an inner transverse rail 44 on each side of cart 2 supports wheel assemblies 21 as described further below. One or more intermediate rails 46 may run width-wise between the innermost lateral rails 45 to form supporting strut(s). This way, the two transverse end rails 42 on each side of cart 2 protrude approximately four inches side-to-side and the rounded corners are adorned with plastic to form optional bumper features as described herein. However, it should be understood that in other embodiments lower deck 4 may comprise more or fewer than eight transverse rails 42-45 as shown such that the optional bumper feature may be eliminated from the cart design. In addition or alternatively, and based on design and loading preference, wheel assemblies 21 may be affixed to two transverse end rails 43, 44 for added support. Optionally, based on design or loading preference, side rail assemblies 6A, 6B may be affixed to and supported by the transverse end rails 43 as well, which can also serve as support for wheel assemblies 21. Finally, intermediate rail(s) 46 may be eliminated in favor of additional transverse end rails 43-45 to serve as strut(s ). In yet another embodiment (shown in FIG. 5), lower deck 4 may be overlayed with a solid sheet metal surface.

Lower deck 4 is mounted atop four heavy duty castor wheel assemblies 21 (preferably locking castors) for portability. Wheel assemblies 21 may be mounted on one or more of transverse rails 43-45 (shown in FIG. 1), or alternatively on intermediate rails 46 or lateral rails 41.

Side rail assemblies 6A and 6B are also each formed from a single piece of tubular stock bent into a generally rectangular framework, each comprising two vertical rails joined by two horizontal rails at top and, bottom. The bottom of each side rail assembly 6A, 6B rests on and is joined to one or more transverse rail(s) 43-45 by weldment, screw, nut and bolt or other, known fastening, means. Side rail assemblies 6A, 6B are preferably between 4ft and 8ft high.

Figure 2:
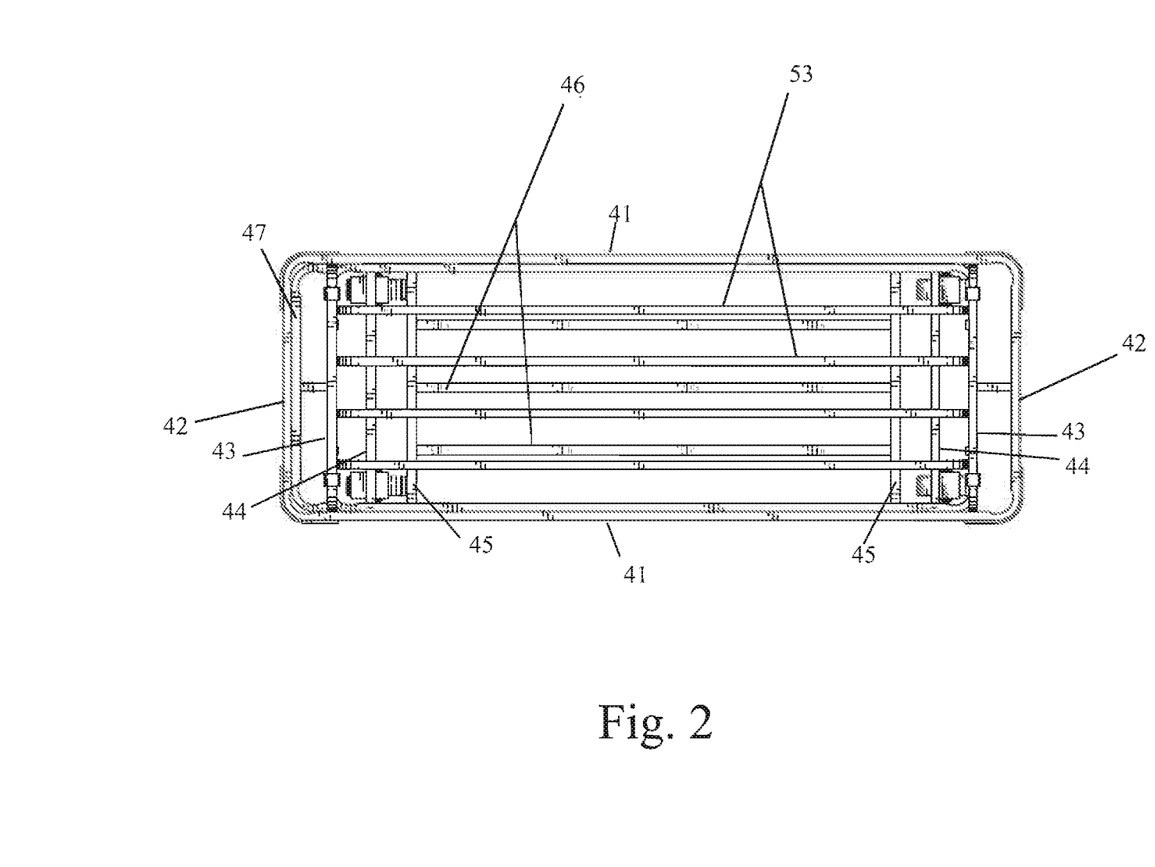
FIG. 2 is a top view of the utility cart as in FIG. 1.

In addition, of e or both side rail assemblies 6A, 6B may comprise an outward facing handle 47 extending away from the interior of cart 2 at approximately mid-level for ease of gripping and maneuvering cart 2 Handles 47 may be constructed of the same materials as those used for side rail assemblies 6A, 6B and affixed to side rail assemblies 6A, 6B by weldment, screw, nut and bolt or other known fastening means. Importantly, handles 47 are identically shaped to the outermost transverse rails 42 and share the same rounded corners, but handles 47 are scaled roughly two-thirds the size of end rails 42. This way, the outermost transverse rails 42 protrude approximately one inch outward past handles 47 and protect handles 47, or more importantly protect any hands gripping handles 47 (see also FIG. 2).

Side rail assemblies 6A, 6B are each further reinforced by one or more horizontal struts 61 positioned between the vertical rails forming side rail assemblies 6A, 6B. Struts 61 provide structural support for the structure of side rail assemblies 6A, 6B and support for a unique suspended shelving system as will be described. Struts 61 preferably are not integrally formed with side rail assemblies 6A, 6B but are attached thereto at either end of strut 61 using screw, nut and bolt or other known fastening means. The number and vertical location of struts 61 along the height of side rail assemblies 6A, 6B may be chosen as a matter of design preference in accordance with the preferred number and spacing of shelf assemblies 50 as described in further detail below. Side rail assemblies 6A, 6B are identical for manufacturing economy and to support shelf assemblies 50 at an even height as herein described.

All of the framework for the above-described is preferably formed of powder-coated tubular steel stock or aluminum tubing welded together. The major lengths of the rails forming the lower deck 4 and side-rail assemblies 6A and 6B are preferably square steel or aluminum tubing.

Referring still to FIG. 1, one or more shelf assemblies 50 are secured to cart 2 via side rail assemblies 6A, 6B. As shown in FIG. 1, each shelf assembly 50 is suspended between a single pair of struts 61 wherein each strut 61 of the pair is positioned in side rail assemblies 6A, 6B at the same vertical height relative to the other member of the pair. In addition, and also as shown in FIG. 1, a shelf assembly 50 may be suspended between the top horizontal member comprising side rail assemblies 6A, 6B.

Each shelf assembly 50 comprises a generally rectangular framework 51 to which suspension bands 52 are attached as a means for securing shelf assembly 50 to side rail assemblies 6A, 6B. Suspension bands 52 are preferably formed from powder-coated steel in an S-type configuration as shown in FIG. 1 such that suspension bands 52 comprise a rectangular hook at one end for attachment to side rail assemblies 6A, 6B and a reverse-facing rectangular hook at the opposing end for attachment to shelf assembly 50. Alternatively, suspension bands 52 may be integrally formed with shelf assembly 50 such that one single, roughly U-shaped suspension band stretches width-wise between opposing side rail assemblies 6A and 6B, attaching at one end to side rail assembly 6A and at the opposing end to side rail assembly 6B and forming one full rail of the shelf basket 53. The length of suspension bands 52 between their attachment to side rail assemblies 6A or 6B and their attachment to, or integration with, shelf assembly 50 may be determined as a matter of design preference provided that four suspension bands 52 of equal length are provided to support each shelf assembly 50. Preferably, each cart 2 has a number of shelf assemblies having varying heights and vertical clearance distances as dictated by the length of the suspension bands 52 supporting an individual shelf assembly 50 and by the vertical height of the strut 61 or member of side rail assembly 6A, 6B to which the shelf is affixed. A set of two width-spanning suspension bands 52 may be integrally formed with a single shelf assembly 50 as described above or a set of four suspension bands 52 (comprising a vertical S-shaped member only) may be permanently affixed to an individual shelf assembly 50 to provide a single interchangeable shelf unit for easy attachment to the body of cart 2 post-manufacture. Alternately, suspension bands 52 may be interchangeable with shelf assemblies 50 and attached by screw, nut and bolt or other means known in the art.

Figure 3:
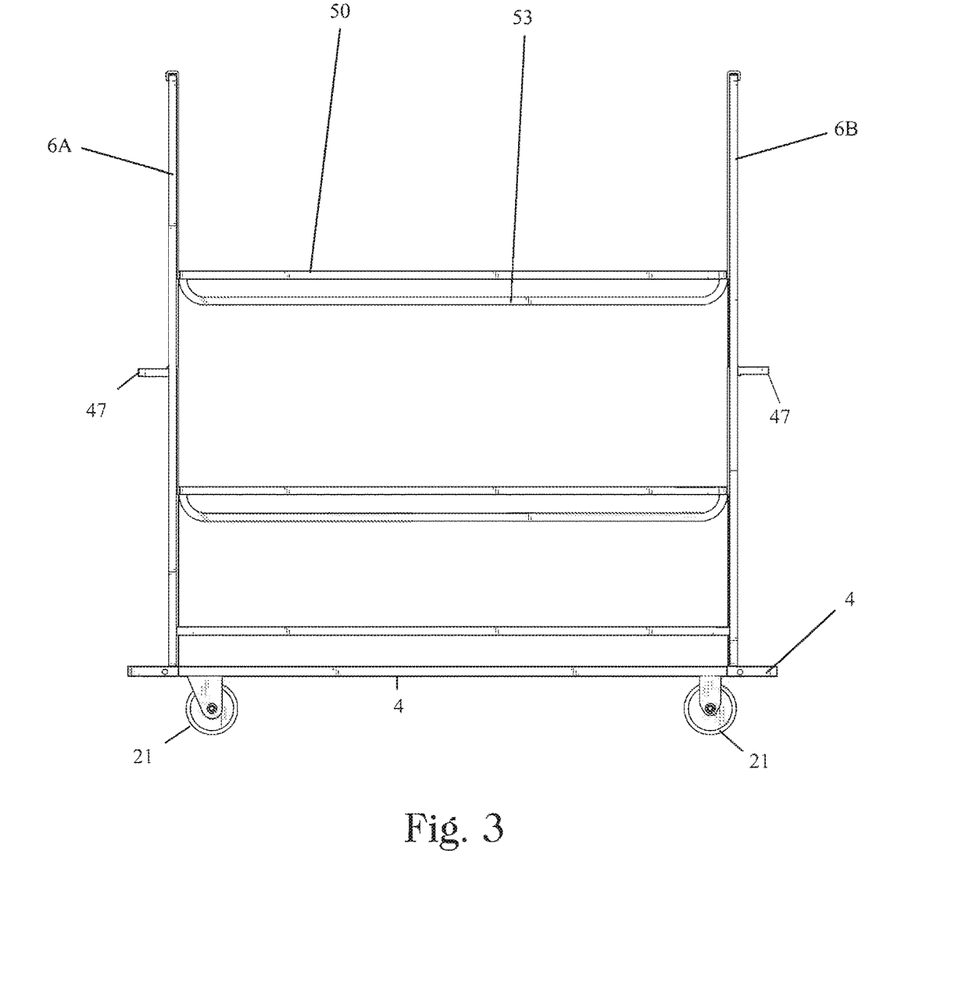
FIG. 3 is a front view of the utility cart as in FIG. 1.
Figure 4:
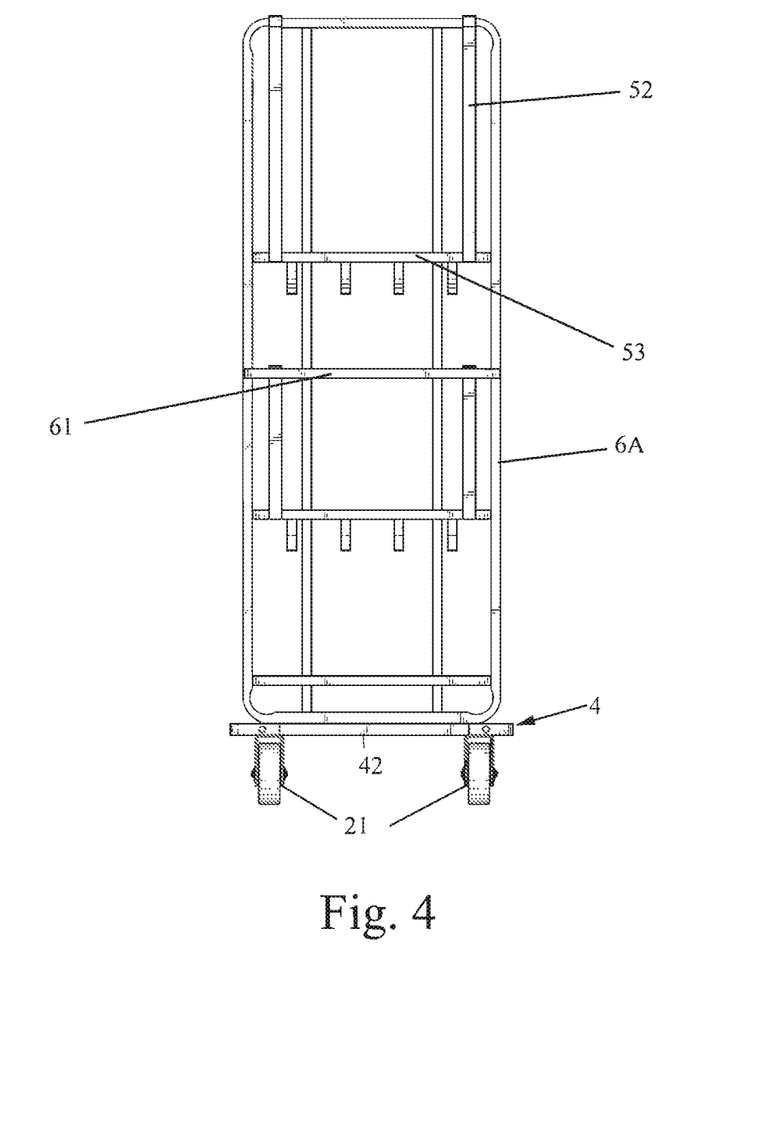
FIG. 4 is a side view of the utility cart as in FIG. 1.

The horizontal weight-bearing surface of shelf assemblies 50 may be a basket-type assembly as shown in FIGS. 1 and 3-4 comprising a plurality of rails 53 spanning the width of the shelving assembly 50 between opposing edges of the rectangular framework 51 forming the footprint of the shelving assembly 50. Preferably, rails 53 rest below the shelving assembly framework 51 as viewed from the front of cart 2 (as shown in FIG. 3) and form a 90 degree curve at either distal end thereof to join framework 51. This configuration allows framework 51 to serve as a side rail to pieces of equipment resting on the shelving assembly 50 to prevent them from tipping or falling out of the shelving assembly 50.

As described above, shelving assemblies 50 attach to side rail assemblies 6A, 6B via the end of suspension bands 52 comprising a rectangular hook configured to loop over the top edge of strut 61 or other horizontal member on side rail assemblies 6A, 6B. A screw, bolt or other fastening device is inserted through the top portion of the rectangular hook on suspension band 52 and then through the top of strut 61 or the top edge of side rail assemblies 6A, 6B to secure suspension band 52, and thereby the shelving assembly it supports, to cart 2. Suspension bands 52 and side rail assemblies 6A, 6B may be prefabricated with holes to accept a fastening device at locations that correspond to the point of attachment of suspension bands 52 with side rail assemblies 6A, 6B once properly assembled.

In this way, shelving assemblies having different vertical clearance heights (as dictated by the length of suspension straps 52 corresponding to the given shelf assembly) may be fastened to cart 2 post fabrication to suit the needs of an individual voting season. Accordingly, where a given precinct requires certain large pieces of voting equipment having a large vertical height, one or more shelving assemblies 50 may be removed or lowered to accommodate the required equipment. The storage capabilities are much more modular and reconfigurable than those available in the prior art. Likewise, additional shelving having the desired vertical clearance may be added to accommodate smaller equipment for a precinct requiring such equipment. Moreover, the suspended configuration of shelving assemblies 50 allows cart 2 to hold a greater weight of voting equipment overall.

Figure 5:
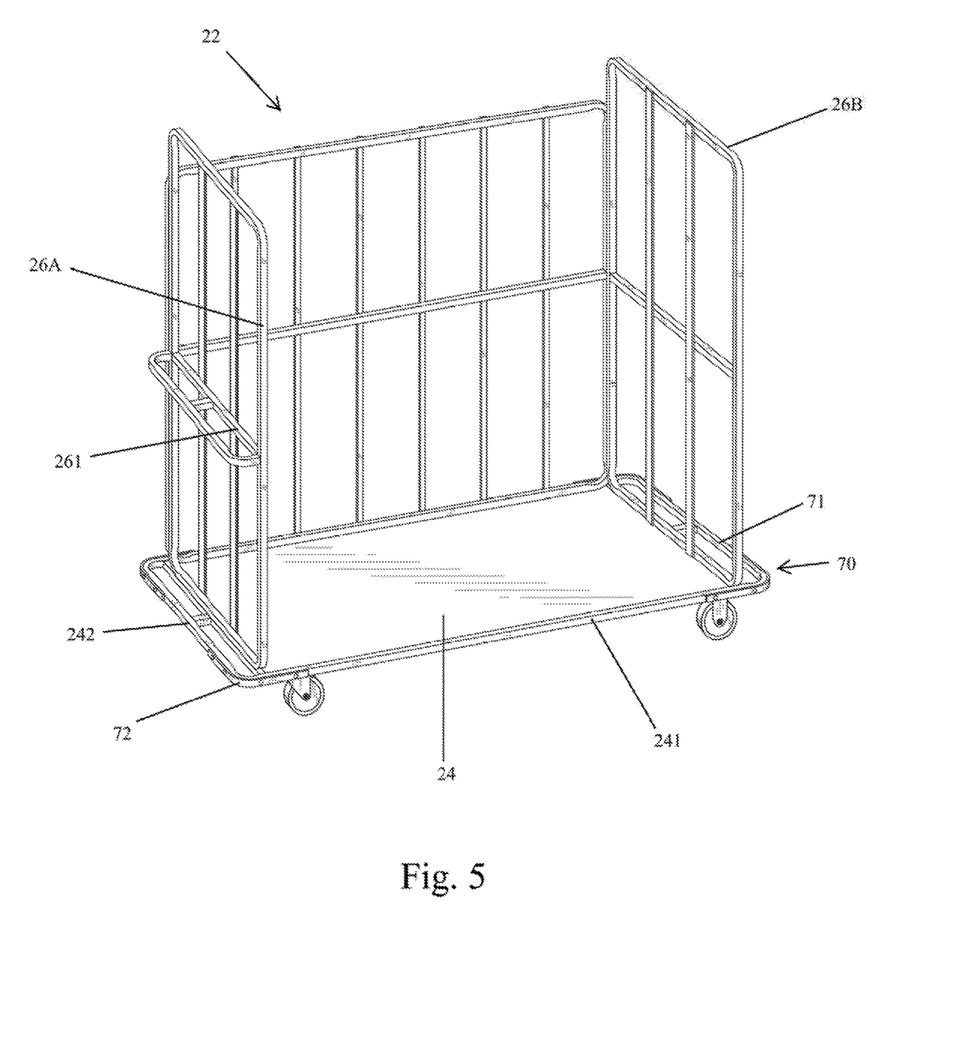
FIG. 5 is a front perspective view of the utility cart according to a second embodiment of the present invention.

FIG. 5 depicts a second embodiment of a utility cart 22. According to the second embodiment of the present invention, cart 22 is of the type generally described above with respect to the first embodiment disclosed herein, optionally comprising the suspended shelf feature described above or alternately comprising any number of standard shelving assemblies (not shown) that may or may not be directly attached to struts 261 or side rail assemblies 26A, 26B. In another alternative embodiment, cart 22 does not support any shelves but comprises a lower deck 24 overlayed with a solid sheet metal surface for holding overly bulky or heavy equipment.

In addition, the lower deck 24 of the cart 22 of instant embodiment comprises a bumper 70 protruding from the outer edges of lower deck 24 on two or more sides. Bumper 70 is preferably formed of powder-coated steel or aluminum tubing welded together, and more preferably, is formed of square steel or aluminum tubing. Bumper 70 preferably is formed from an extension of lateral rails 241 and a cross piece 71 joining the corresponding ends of front or back rails 241 perpendicular to same to form a wider rectangular frame.

In addition to a bumper 70 on both sides of cart 2, bumper 70 may additionally extend past the lateral vertical sides of the main body of cart 2 represented by the area enclosed by side rail assemblies 26A, 26B. Thus, transverse rails 242 and bumper 70 may be deeper than the depth of side rail assemblies 26A, 26B such that lateral rails 241 are held away from the base of side rail assemblies 26A, 26B. Bumper 70 preferably protrudes ½ in. away from the sides and front of cart 22.

The corners of bumper 70 are preferably fitted with a corner piece 72 made from rubber, plastic, or other flexible material to soften any impact of cart 22 with a wall or other object, including an adjacent cart. This feature advantageously enhances the ability of cart 22 to be easily transported by laypeople such as those who regularly oversee the operation of polling places and organize and transport voting equipment in that carts 22 laden with heavy equipment will not be able to impact each other along the side rail assemblies or optional handle, where the hands of a user are commonly placed to direct the cart's movement. The inability of the carts to impact each other at the level of shelving not only prevents injury to the operator of the cart but also advantageously softens any impact to the equipment itself, especially where delicate computerized voting equipment is being used. In addition, a large volume of voting equipment is commonly stored in a common storage location between election cycles for safekeeping. The rectangular structure and the bumper features of the present invention advantageously make transportation and storage of the voting equipment on the carts themselves simpler and safer in that multiple carts may be "stacked" horizontally in close proximity to one another in a storage facility or on a truck bed wherein occasional jolts to one of the carts being stored or transported does not cause a large impact to be felt by the equipment on an adjacent or nearby cart.

It will be also understood to one skilled in the relevant art that, as described above, the herein described cart is adaptable to various uses in fields other than the transportation and storage of voting equipment, such as in the medical field, where hospital administration necessitates the storage and transport of equipment of various and changing sizes and shapes which must be readily available upon arrival. For example, supplies for a large hospital may be stored off-site from the hospital itself, in a non-medical building on the hospital's campus and/or in a warehouse and/or or distribution center. Equipment and supplies of various shapes, sizes, weights, etc. may be stored on its own or in packaging, such as in boxes, that correspondingly have various shapes and sizes. Equipment and supplies used by hospitals may need to be replenished on a daily or more frequent basis to meet the needs of the hospital staff and patients. When supplies and/or equipment are stored on the carts according to the present invention, they are easily accessible by hospital staff when they are needed. The cart(s) including the necessary supplies may be transported directly from the storage area to a transport vehicle, transported to the hospital facility where they are needed, and wheeled to the appropriate hospital location, where the supplies and/or equipment may be ready for use by hospital staff directly from the cart. Thus, the cart according to the present invention streamlines the process for the storage, transportation, and use of supplies and/or equipment of various sizes and weights that are used in the medical or other fields which do not need to be removed from the cart in order to be used.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

We claim:

1. A utility cart for transporting machines having different sizes and shapes, comprising:
    a pair of opposing side-rails defined by contiguous tubing formed in a rectangular loop having first and second vertical rails, said first and second vertical rails being joined at a bottom end by a first horizontal rail and at a top end by a second horizontal rail, and at least one horizontal strut running from said first vertical rail to said second vertical rail between said first horizontal rail and second horizontal rail;
    a generally rectangular deck defined by contiguous tubing formed in a rectangular loop and at least two pair of cross-struts welded across the rectangular deck, a first pair of cross-struts being secured beneath said first horizontal rails of said pair of opposing side rails;
    a plurality of castors mounted beneath said deck to a second pair of cross-struts;
    a suspended shelf affixed to said at least one horizontal strut, said shelf having a horizontal surface, said horizontal surface being suspended vertically beneath horizontal strut.

2. A utility cart for transporting machines having different sizes and shapes as in claim 1, wherein said generally rectangular deck is configured substantially in a rectangle with rounded edges.

3. A utility cart for transporting machines having different sizes and shapes as in claim 2, wherein said rounded edges each comprise approximately a 3" radius.

4. A utility cart for transporting machines having different sizes and shapes as in claim 1, wherein the first horizontal rail of each side rail is attached lengthwise along a corresponding one of said first pair of plurality of transverse reinforcing rails.

5. A utility cart for transporting machines having different sizes and shapes as claim 4, wherein each side rail is within a range of from 4 to 8 feet high.

6. A utility cart for transporting machines having different sizes and shapes as in claim 4, wherein said suspended shelf is suspended from the second horizontal rail of each side rail by a pair of suspension bands having a hook at one end and a reverse-facing hook at the opposing end.

7. The utility cart for transporting machines having different sizes and shapes as in claim 6, wherein said suspension band hooks comprise a three-sided rectangle.

8. A utility cart for transporting machines having different sizes and shapes, comprising:
    a pair of opposing side-rails defined by contiguous tubing formed in a rectangular loop having first and second vertical rails, said first and second vertical rails being joined at a bottom end by a first horizontal rail and at a top end by a second horizontal rail, and at least one pair of horizontal struts running from said first to said second vertical rail between said top end and bottom end;
    a generally rectangular deck comprising a contiguous tubular member formed in a rectangular loop with rounded corners, and a plurality of pairs of transverse reinforcing rails welded to and spanning said contiguous rectangular tubular member, said pair of opposing side-rails each spanning said contiguous rectangular tubular deck parallel to and atop a first pair of transverse reinforcing rails;
    a plurality of castors mounted beneath said deck offset from said pair of opposing side-rails;
    a suspended shelf affixed to each of said at least one pair of horizontal struts, each said shelf having a horizontal surface, said horizontal surface being suspended vertically beneath said corresponding horizontal struts, each said suspended shelf being, suspended by a pair of suspension bands having a hook at one end and a reverse-facing hook at the opposing end.

9. A utility cart for transporting machines having different sizes and shapes as in claim 8, wherein said rounded corners protrude outwardly from said pair of opposing side-rails to function as bumpers.

10. A utility cart for transporting machines having different sizes and shapes as in claim 9, wherein said rounded corners each comprise approximately a 3" radius.

11. A utility cart for transporting machines having different sizes and shapes as in claim 8, wherein the first horizontal rail of each side rail is attached to said first pair of transverse reinforcing rails.

12. A utility cart for transporting machines having different sizes and shapes as in claim 11, wherein each side rail is within a range of from 4 to 8 feet high.

13. The utility cart for transporting machines having different sizes and shapes as in claim 12, wherein said suspension band hooks comprise a three-sided rectangle.

* * * * *